Feb. 4, 1964    L. E. SPRECHER    3,120,359
AIRCRAFT WITH EQUI-SPACED POWER PLANTS
Filed Nov. 4, 1959    4 Sheets-Sheet 1

INVENTOR
LESTER E. SPRECHER

BY *Garvey & Garvey*
ATTORNEYS

Feb. 4, 1964     L. E. SPRECHER     3,120,359
AIRCRAFT WITH EQUI-SPACED POWER PLANTS
Filed Nov. 4, 1959     4 Sheets-Sheet 2

INVENTOR
LESTER E. SPRECHER

BY
*Garvey & Garvey*
ATTORNEYS

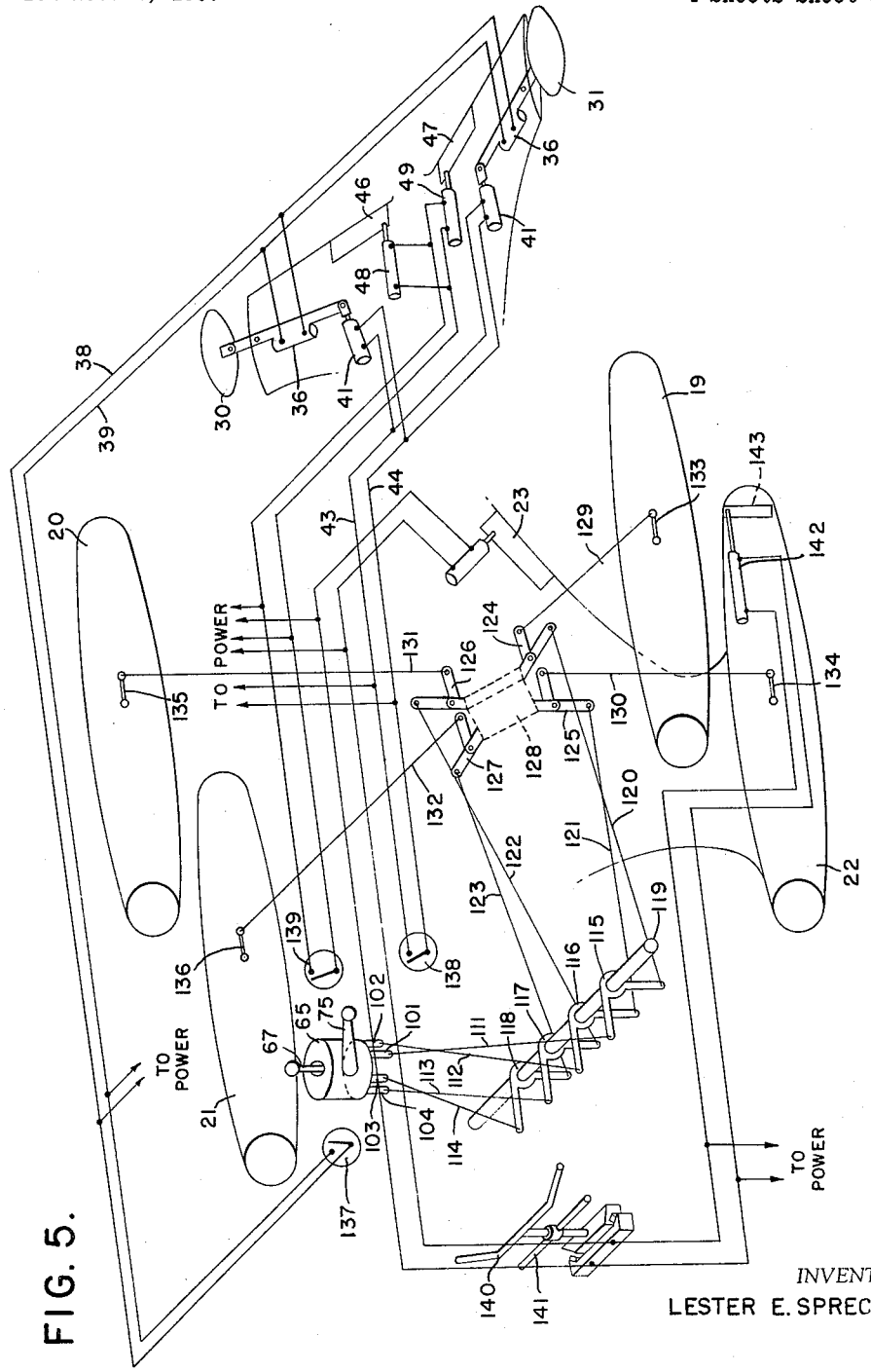

Feb. 4, 1964 L. E. SPRECHER 3,120,359
AIRCRAFT WITH EQUI-SPACED POWER PLANTS
Filed Nov. 4, 1959 4 Sheets-Sheet 4

INVENTOR
LESTER E. SPRECHER

BY Garvey & Garvey
ATTORNEYS

United States Patent Office 3,120,359
Patented Feb. 4, 1964

3,120,359
AIRCRAFT WITH EQUI-SPACED POWER PLANTS
Lester E. Sprecher, 1760 Sheridan Ave., Hagerstown, Md.
Filed Nov. 4, 1959, Ser. No. 850,853
14 Claims. (Cl. 244—12)

This invention relates to an airship, which can take-off from, and land in, a vertical position and alter its attitude to horizontal flight upon reaching the desired planing speed.

Other objects are to provide an airship having multiple engines supported in predetermined spaced relation to the fuselage and to each other, the flight attitude and direction of the airship being controlled by manipulation of the power level of the individual engines; to provide an airship of the character described in which the center of gravity thereof is located aft of the thrust plane; to provide an airship including multiple engines capable of equal thrust, and control mechanism for effecting measured thrust of any or all engines, above or below equal thrust plane; and to provide an airship requiring no air foils, control surfaces or flap lift areas based on involved aerodynamics.

Other objects of the invention will be manifest from the following description of the present preferred form of the invention, taken in connection with the accompanying drawings, wherein:

FIG. 5 is a schematic view of the control system for the present invention;

Figures 1, 2, 4:
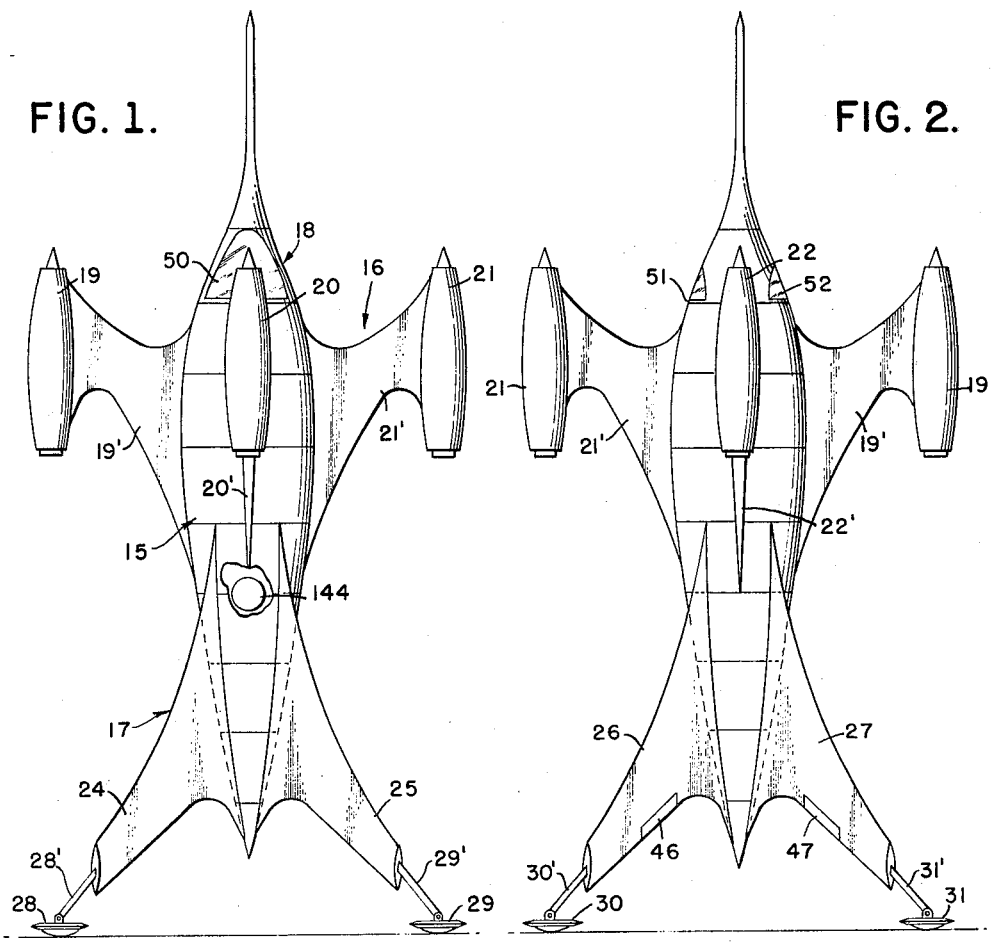
FIG. 1 is a side elevational view of an airship constructed in accordance with the present invention, showing the same in take-off or landing position.
FIG. 2 is a side elevational view similar to FIG. 1 taken from the other side of the airship.
FIG. 4 is a front elevational view of the same.

The airship of the present invention is of an artistically sleek but functional design and generally includes a fuselage suspended on a theoretical thrust plane comprising three or more engines positioned in different planes forward of the ship and spaced equi-distant from the fuselage and from each other, which engines are capable of equal thrust and are forward of the ship's center of gravity. These engines may be channel wings in various adaptations, turbo jets, ram jets, atomic power, or controllable rockets. Control mechanism is provided for effecting measured thrust of any or all engines above or below the equal thrust plane. The maximum equal thrust required is greater than the overall weight of the ship plus the allowance added for maximum control force. The full thrust action is needed for a short period only while taking off and landing, when the planing surfaces are ineffective. At this time, the airship is in a vertical position.

Vertical take-off is accomplished by setting engine thrust at a balanced level, just under the complete thrust weight of the ship. Then, by unified action, thrust is advanced above the required level to lift the ship off the ground. As the ship increases its vertical speed, the planing action of the fins becomes more effective and, with continuing thrust, they will support the ship in a somewhat planing action. When the desired speed and altitude is reached, transition to horizontal flight is effected simply by added thrust to the engine or engines over the pilot's head and reduced thrust to the engine or engines beneath him. In similar fashion, direction of the airship is altered by increasing and decreasing the thrust of the side engines.

In order to land, power is increased on the engine located below the fuselage, which pulls the ship up to a vertical position. The thrust on the engines is then balanced to equal the ship's weight. With the center of gravity below the thrust plane, the ship may then be gently set down on the ground by decreasing the power on all engines equally.

Basically, therefore, the present airship's design and operation are not based on involved aerodynamics, such as air foils, control surfaces, flap lift areas, etc., which are not only costly, but also difficult to perfect and cause a great loss to structural members to install. The flutter and vibration which these members produce are, therefore, virtually eliminated in the present ship. The speed of the ship is limited only by the amount of power used to propel it. Also, because of its power control feature, in conjunction with controllable non-air breathing engines, the present airship is equally adapted for space, as well as atmospheric, flights.

Referring now in greater detail to the drawings, the numeral 15 designates a fuselage on which is mounted near the front end an engine assembly 16 and, near the aft end thereof, a tail assembly 17. A pilot compartment and control center 18 is located near the extreme forward portion of the fuselage.

Engine assembly 16 includes a multiplicity of engines in excess of two and, for purposes of illustration, there are shown in the drawings four engines designated 19, 20, 21 and 22, respectively. These engines are supported at 90-degree intervals in equally spaced relation to fuselage 15 on engine mounts, which are planing surfaces designated 19', 20', 21' and 22', respectively. These mounts also serve as part of the ship's fuel tanks. It will be noted from a consideration of FIGS. 1 to 4 that engines 19, 20, 21 and 22 are supported diametrically equal from the center line of fuselage 15, the radial distance of the engines from the center line of the fuselage being determined by the thrust leverage necessary to normally change the attitude of the ship at all speeds. Sufficient distance is maintained to allow for heat in the area of fuselage 15 and tail assembly 17. A small tab 23 is located at the aft edge of support 22' to effect roll stability of the airship in atmospheric flights, if desired.

Tail assembly 17 includes a plurality of fins designated 24, 25, 26 and 27, disposed longitudinally of the fuselage, fins 24, 26, and 25, 27 standing in diametrically opposed relationship to each other. As shown in FIG. 4, the fins are mid-spaced radially between engine supports 19', 20', 21' and 22'. The outer limits of the fins are capped with streamlined retractable fairings 28, 29, 30 and 31, respectively, which serve as landing pads on which the ship rests upon the ground. Each of the landing pads is pivotally connected to the outer terminal of arms 28', 29', 30' and 31', respectively, which pass through openings in the outer extremities of the fairing walls.

Figure 7:
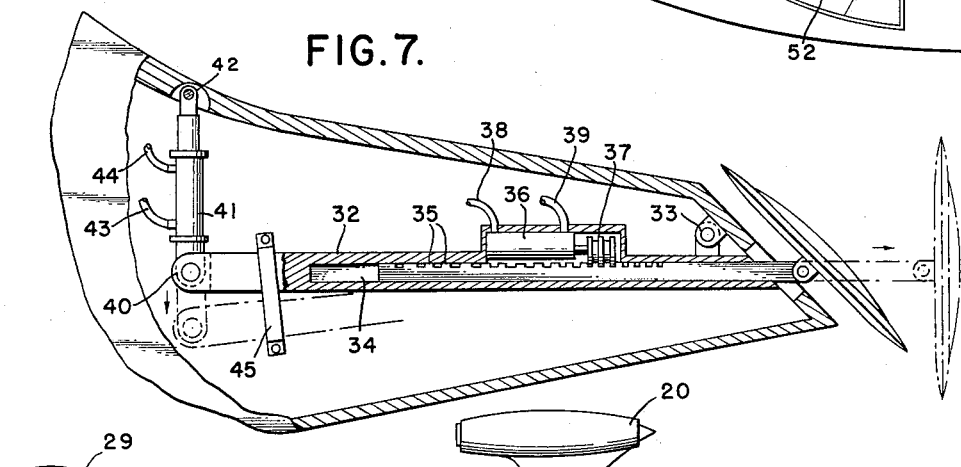
FIG. 7 is an enlarged fragmentary elevational view of one of the fins forming a part of the present invention, portions thereof being shown in section to disclose details of construction of the landing pad assembly.

The landing pad assemblies are of similar construction and, for purposes of illustration, there is shown in FIG. 7 an enlarged detailed view of one of the retractable pads. This assembly includes a rectangular housing 32 pivotally connected at 33 to an inner wall of the fin adjacent the opening through which the retractable fairing passes. Housing 32 is bored out at 34 through a substantial portion of its length to receive the pad arm, the innermost portion of which arm is provided with a series of teeth 35 which form a spur screw rack. Superjacent teeth 35 is suitable power means 36 having a shaft on which is formed worm gearing 37 adapted for engagement with teeth 35. Power connections for the power means are indicated at 38 and 39.

With further reference to FIG. 7, it will be noted that the aft end of rectangular housing 32 is pivoted at 40 to a second power means 41, the free end of which is pivoted at 42 to the inner wall of the fin. Control wires are indicated at 43 and 44. Each of the power actuators 41 serves as a shock mount and, as shown in dotted lines in FIG. 7, affords means for adjusting the angular relationship of the landing pad arms to compensate for varying terrain.

A plate 45 secured to both inner walls of the fin serves as a guide member to allow a sliding motion of rectangular housing 32 and its connected parts.

Figure 3:
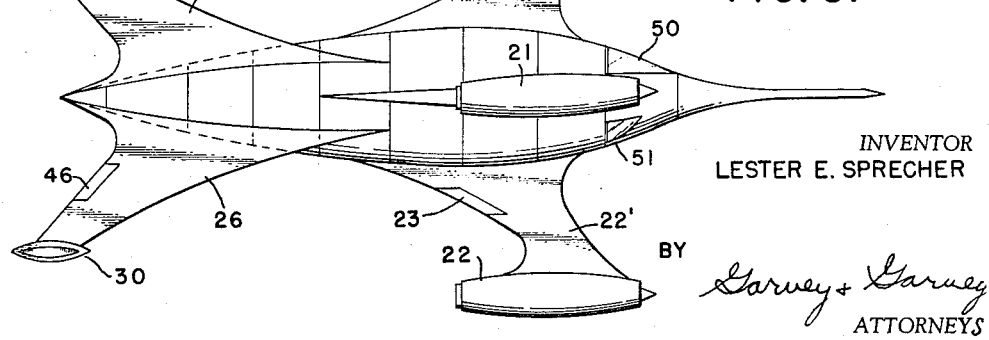
FIG. 3 is a side elevational view of the airship of the present invention, showing the latter in horizontal flight.

It will be noted, from FIGS. 2 and 3, that the aft edges of lower tail fins 26 and 27 are provided with a pair of like trim tabs 46 and 47, which are operated up and down in a conventional manner by power means 48 and 49, which are schematically illustrated in FIG. 5. These tabs serve to control planing in relation to loading.

Figure 6:
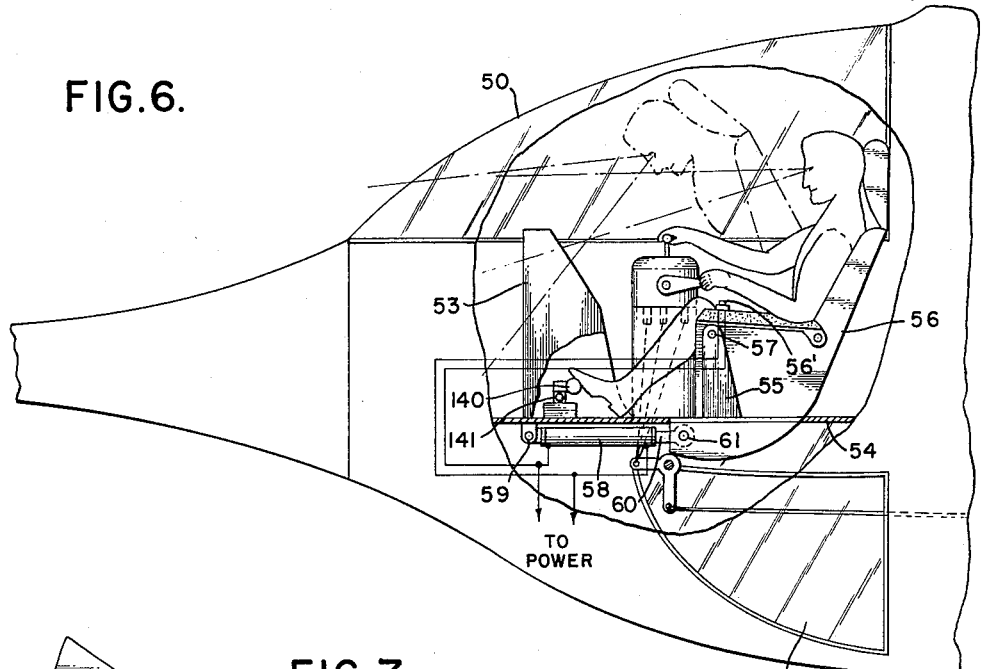
FIG. 6 is an enlarged fragmentary side elevational view of the cockpit section of the airship, a portion thereof being broken away to disclose details.

The pilot compartment and control center 18 is preferably located near the front tapering end of the fuselage and extends through and forward of the thrust plane. An upper window is indicated at 50 and lower window panels at 51 and 52. As shown to advantage in FIG. 6, compartment 18 includes a stationary console 53 which houses gauges and actuating members, which will be hereinafter more fully set out. Aft of console 53 is a fixed platform 54 on which are mounted a pair of stanchions 55. A pilot's chair 56 is mounted between said stanchions, the upper terminals of stanchions 55 being pivoted to said chair at 57 adjacent the arm-rests thereof. For pivoting pilot's chair 56 to the position shown in dotted lines in FIG. 6, there is provided a power cylinder 58 pivotally secured at 59 to a fixed portion of the airship. A piston 60 extends from cylinder 58 into pivotal engagement with a fixed member 61 of chair 56. Button 56' on the arm-rest of chair 56 is pushed to actuate piston 60 to an extended position, chair 56 being rotated about pivot point 57 moving the pilot and chair in an arc. This latter position facilitates operation of the ship controls by the pilot and aids his vision when the ship is in vertical position, either taking off or landing.

Figure 8:
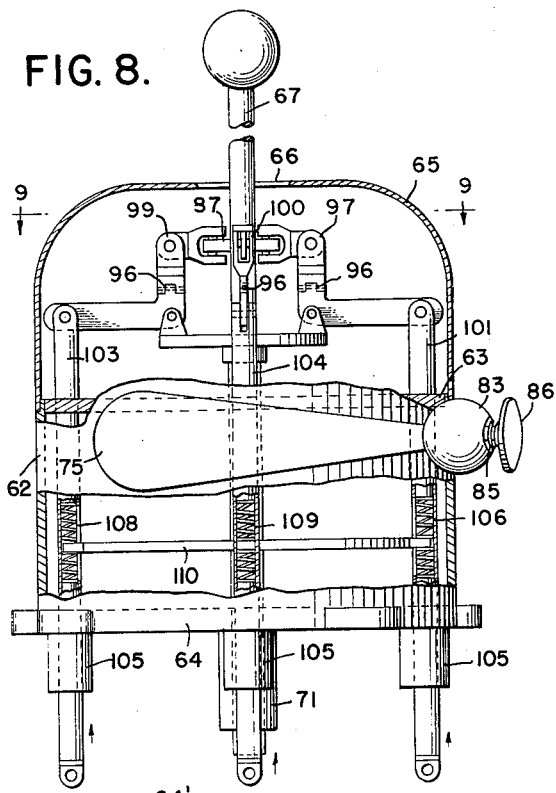
FIG. 8 is a side elevational view of the engine control center assembly forming a part of the present invention, portions thereof being broken away to disclose details of construction.
Figure 10:
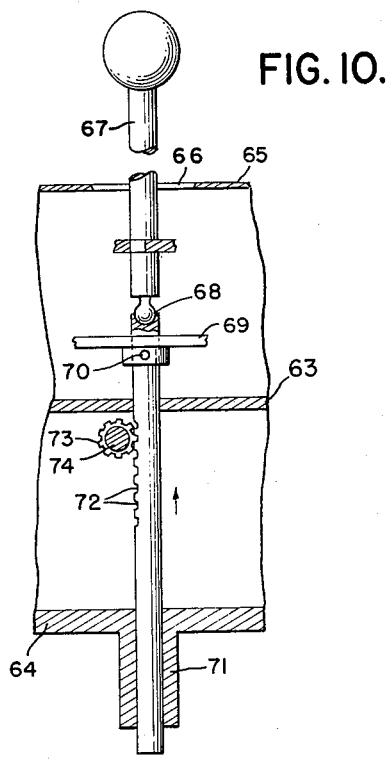
FIG. 10 is an elevational view of the secondary control throttle lever per se forming a part of the engine control center assembly.
Figure 9:
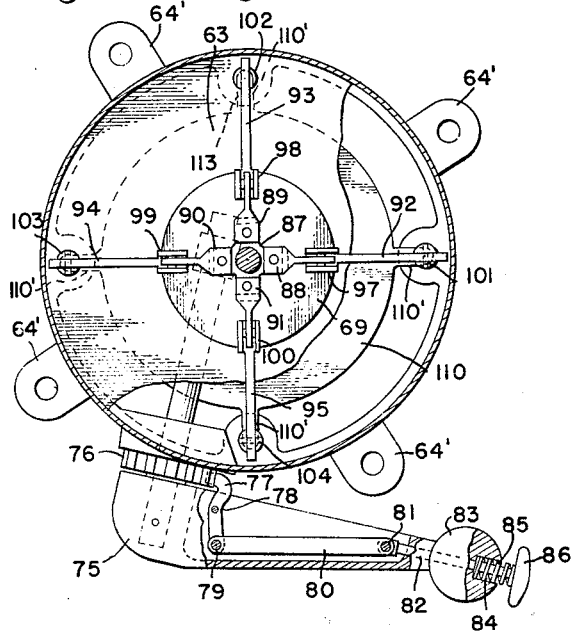
FIG. 9 is a sectional view taken along the lines 9—9 of FIG. 8, looking in the direction of the arrows.

The control center is shown to advantage in FIGS. 8, 9 and 10 and generally comprises a circular casing 62 having a top wall 63 and a bottom wall 64. Mounting lugs are indicated at 64'. A removable cover 65 is adapted to be placed on top of casing 62, as shown in FIG. 8.

Referring now to FIG. 10, it will be seen that cover 65 is provided with a circular opening 66 through which a control stick 67 passes, said control stick being disposed vertically in the control center housing. At a point intermediate its length, control stick 67 is provided with a ball and socket joint 68 to permit relative movement of the upper part of the stick with respect to the lower portion thereof. Below universal joint 68, stick 67 passes through a sleeved support 69, the latter being fixed to the stick at 70. Stick 67 then passes through casing top wall 63 and also through bottom wall 64 and a central sleeve extension thereof 71. It will be seen from FIG. 10 that intermediate top wall 63 and bottom wall 64, stick 67 is provided with a plurality of teeth 72 which form a spur-gear rack adapted for meshing engagement with a spur gear 73 carried and rotated by a shaft 74 extending outwardly through an opening in the side wall of housing 62. Lever 75 is fixed to the outer terminal of shaft 74, which lever serves as a primary throttle for moving stick 67 vertically within housing 62.

For locking the lever 75 in selected position, there is provided a gear 76 fixedly mounted on housing 62 in concentric relation to shaft 74. A locking member 77 is normally engaged with said gear, the locking member being pivoted to lever 75 intermediate its length at 78. The free end of member 77 is pivoted at 79 to a lever arm 80 which in turn is pivoted at 81 to a release arm 82 which passes through a ball end 83 of housing 75. A portion of the opening in the ball end of housing 75, through which arm 82 passes, is enlarged at 84 to receive a coil spring 85, the outer extremity of which engages a knob 86. To operate the normally locked lever or primary throttle 75, knob 86 is pushed inwardly against the tension of spring 85, thereby forcing release arm 82 and lever arm 80 inwardly with consequent rotation of locking member 77 about pivot point 78 to withdraw the member from locking engagement with gear 76. Lever 75 may then be freely rotated to rotate shaft 74 and, through gear 73, to effect vertical movement of stick 67.

In conjunction with stick 67, there is provided a cross-shaped member 87 having a central perforation through which stick 67 passes at a point below the top of cover 65. The arms of member 87 are flexibly connected to fork members 88, 89, 90 and 91, which in turn are pivotally connected at their outer terminals to L-shaped lever arms 92, 93, 94 and 95. Each of the lever arms is provided with a hinge joint 96 to permit relative movement of the vertical portions of said arms with respect to the horizontal portions thereof. As shown in FIG. 8, L-shaped lever arms 92, 93, 94 and 95 are pivotally connected intermediate their lengths to lugs 97, 98, 99 and 100, respectively, which are secured to the upper face of sleeved support 69. At their outer extremities, the L-shaped arms are pivoted to vertically-depending engine throttle control arms 101, 102, 103 and 104, the number of control arms corresponding to the number of engines. The control arms in turn extend downwardly through bottom 64 and a plurality of like cylindrical extensions 105. Control arms 101, 102, 103 and 104 are all provided with spring housings 106, 107, 108 and 109, which normally maintain equal pressure on the control arms and maintain stick 67 in a central position. A disc 110 is centrally mounted on stick 67 at a point adjacent bottom wall 64 and is provided with four outwardly extending lugs 110' which are interposed between the coil spring housings. This maintains the proper tension on the coil springs at all times. Arms 101, 102, 103 and 104 are movable vertically in pairs upon movement of stick 67 in the direction of any of the arms. This effects a downward movement of the arm in the direction which stick 67 is moved and an upward movement of the arm in opposed relation thereto. The other two arms remain in place. To move the four throttle control arms as a unit, a knob 86 of lever 75 is depressed to move locking member 77 out of engagement with gear 76. Lever 75 is then rotated to effect rotation of shaft 74 and gear 73, with resultant vertical movement of stick 67. Since arms 101, 102, 103 and 104 are secured to stick 67, they move in unison therewith.

Referring now to FIG. 5 showing the device of the present invention schematically, it will be seen that operating rods 111, 112, 113 and 114 are connected to the lower terminals of arms 101, 102, 103 and 104, respectively. The operating rods extend downwardly into engagement with bell crank levers 115, 116, 117 and 118 mounted on a supporting rod 119. Intermediate rods 120, 121, 122 and 123 are connected at one end to the free arms of bell crank levers 115, 116, 117 and 118, the opposite ends of said rods being fixed to one arm of a second set of bell crank levers 124, 125, 126 and 127, mounted on a support 128. Throttle control rods 129, 130, 131 and 132 are connected at one terminal to bell crank levers 124, 125, 126 and 127, the free terminal of each of said control rods being engaged with throttle controls 133, 134, 135 and 136 for controlling the power lever of engines 19, 22, 20 and 21, respectively.

With further reference to FIG. 5, it will be noted that there is provided a switch 137 preferably mounted on console 53 in compartment 18, which switch is in circuit with the power means 36 through control wires 38 and 39 of retractable fairings 28, 29, 30 and 31. For purposes of clarity, only two of the fairing members are schematically illustrated, it of course being understood that the other two fairing members are actuated by the same switch. Also mounted on console 53 is a second switch 138 in operative connection with power cylinders 41 of fairings 28, 29, 30 and 31 through control wires 43 and 44 for adjusting the angular relationship of the landing pad arms when desired. A third switch 139 is in circuit with power means 48 and 49 for conventionally controlling trim tabs 46 and 47 of tail fins 26 and 27.

Referring now to both FIGS. 5 and 6, there is provided near the floor of compartment 18 a foot control 140 in circuit with small tab 23 of engine mount 22' to effect roll stability of the airship under all altitude conditions. Below foot control 140 is a second foot control 141 in circuit with a power cylinder 142 which controls a thrust deflector 143 on engine 22, for aiding roll stability.

Roll stability is further aided by a stabilizing gyro 144 mounted in the fuselage aft of the engines (see FIG. 1), which gyro is primarily operative before planing action is attained on take-off and after planing speed is lost at vertical peak before descent.

In actual use, when on the ground, the airship of the present invention normally assumes the vertical position illustrated in FIGS. 1 and 2. At this time the pilot and pilot's chair are in the position shown by dotted lines in FIG. 6, for purposes of optimum visibility and access to the controls and console. In order to take off, primary throttle lever 75 is unlocked and rotated (see FIG. 9) to effect increased thrust of the balanced engines until the airship leaves the ground in a vertical direction. Upon gaining speed the planing fins become more effective and support the ship in a planing action. After the desired altitude is reached, transition to horizontal flight is accomplished by pushing control stick 67 forward (see FIG. 6), thereby effecting downward movement of engine throttle control arm 104, which movement is transmitted through operating rod 113, bell crank lever 117, intermediate rod 122, and throttle control rod 131 to throttle control 135. This increases the power level of overhead engine 20. At the same time, movement of control stick 67 in the direction indicated causes control arm 102 to be moved upwardly and through operating rod 112, bell crank lever 116, intermediate rod 121, bell crank lever 125, throttle control rod 130 actuates control 134 to reduce the power level of engine 22. The direction of flight of the airship is likewise changed by movement of the control stick left or right to increase or decrease the power level of side engines 19 and 21.

In order to land, control stick 67 is pulled back, thereby effecting and increasing power level of engine 22 and a decrease in the power level of engine 20, thereby pulling the ship upwardly to a vertical position. By balancing the thrust on all engines to equal the weight of the ship by manipulation of primary throttle control lever 75 and by equally decreasing the power, the ship may be gently set down on fairings or landing pads 28, 29, 30 and 31, since the center of gravity of the present airship is below the thrust plane thereof.

In an airship constructed in accordance with the present invention, the stability thereof increases with speed. The ship planing at high speeds has forces reacting on all planing surfaces which resist any change in direction. Power control at this point can be demonstrated very effectively. For example, a left turn maneuver can be executed more quickly and deftly by advancing power on the right engine and reducing power on the left engine.

Two other reactions further aid the turn, namely, the pendulum effect of the center of gravity, and the pivotal action on vertical engine support planes. Pressure against the vertical planes gives this ship excellent anti-yaw features.

It is, of course, to be understood that, when the airship of the present invention is employed for space flight, the fuselage lines are modified to the projectile-like contours and diameter of a staged rocket. Being so balanced, the ship on reentry to the atmosphere can utilize full thrust resistance to avoid frictional deterioration.

While I have herein shown and described the preferred embodiment of my invention, it nevertheless to be understood that various changes may be made therein without departing from the spirit and scope of the appended claims.

What I claim is:

1. An airship adapted for vertical take-off and landing including a fuselage, a plurality of primary power engines in excess of two, strategically fixed in equally spaced relation around the fuselage forward of the same, to fix the center of gravity aft of the engines, said engines being positioned in uniplanar relationship, and stabilizing members mounted on the fuselage near the aft end thereof.

2. An airship positioned for vertical take-off and landing and adapted for horizontal flight including a fuselage, power means mounted on the fuselage, a pilot's chair and control member within the fuselage, and means connected with said pilot's chair for rotating the latter in an arc about said control member when the fuselage of the airship is vertically positioned, to facilitate operation of the control member and aid the pilot's vision, said means including a fixed stanchion on each side of said pilot's chair positioned proximate the forward extremity thereof, said chair being pivoted to each stanchion at a point adjacent each arm rest of the chair and a power cylinder pivotally secured to a fixed portion of the fuselage positioned subjacent said pilot's chair, said power cylinder including a piston in pivotal engagement with the lower portion of the front of said pilot's chair and movable rearwardly thereof, to effect rotation of the chair in an arc.

3. An airplane adapted for vertical take-off and landing including a fuselage and primary power motors, in excess of two, strategically fixed in equally spaced relation around the fuselage to fix the center of gravity aft of the motors, the motors being the sole directional control means for the airplane in take-off, in flight or in landing.

4. An airship adapted for vertical take-off and landing including a fuselage, four planing surfaces mounted at 90° intervals around the forward portion of the fuselage, primary power means fixed to said planing surfaces, and stabilizing members mounted on the fuselage near the aft end thereof, said primary means being forward of the center of gravity.

5. An airship, as set out in claim 4, with the addition of landing pad assemblies housed during flight in said stabilizing members, each landing pad assembly including an arm, a fairing pivotally connected to the outer terminal of said arm, and means connected to said arm for extending and retracting said fairing.

6. An airship, as set out in claim 4, wherein said primary power means are provided with throttle controls, a control member operated by the pilot, means connecting the control member to the throttle controls of the multiple power means, for proportionately adding or decreasing equal control thrust leverage to said multiple power means upon actuation of said control member.

7. An airplane including a fuselage, motors with throttle controls strategically positioned around the fuselage to fix the center of gravity of the airplane, stabilizing members mounted on the fuselage near the aft end thereof, and a control member operatively connected to said motor throttle controls, said control member including a casing having a control stick centrally pivoted in said casing, vertically movable actuating rods mounted in said casing equidistant from each other and from said control stick, means selectively connecting said actuating rods to said motor throttle controls, articulate means fixing said actuating rods and control stick together to effect synchronous vertical movement thereof but permitting relative lateral movement thereof, to effect selective vertical movement of said actuating rods, said control member further including gear means in meshing engagement with said control member and an operating lever connected to said gear means for moving said control stick and actuating rods vertically simultaneously to effect adjustment of said motor throttle controls as a unit.

8. An airship adapted for vertical take-off and landing including a fuselage, a plurality of primary power engines in excess of two, strategically fixed in spaced relation around the fuselage forward of the same, to fix the center of gravity aft of the engines, said engines being positioned in uniplanar relationship, and stabilizing members mounted on the fuselage near the aft end thereof, said stabilizing members being mid-spaced radially with respect to said engines.

9. An airship adapted for vertical take-off and landing including a fuselage, a plurality of primary power engines in excess of two, strategically fixed in spaced relation around the fuselage forward of the same, to fix the center of gravity aft of the engines, said engines being positioned in uniplanar relationship, and stabilizing members mounted on the fuselage near the aft end thereof, the said engines being positioned at 90° intervals around, and in spaced relationship to, the fuselage.

10. An airship as set out in claim 9 with the addition of control means including a control member operated by the pilot, and means connecting the control member to the engines for controlling the power level of said engines selectively upon manipulation of said control member.

11. An airship including a fuselage, planing surfaces mounted in equal spaced relation around the forward portion of the fuselage, primary power means fixed to said planing surfaces, and stabilizing members mounted on the fuselage near the aft end thereof, landing pad assemblies housed, during flight, in said stabilizing members each landing pad assembly including an arm, a fairing pivotally connected to the outer terminal of said arm, means connected to said arm for extending and retracting said fairing, and means operatively connected to said arm for adjusting the angular relationship of the arm and connected fairing to compensate for varying terrain.

12. An airship including a fuselage, power means fixedly mounted on the fuselage, stabilizing members mounted on the fuselage rearwardly of said power means, and landing pad assemblies housed during flight in said stabilizing members, each landing pad assembly including a rectangular housing engaged with the inner wall of one of said stabilizing members, said housing being bored out through a substantial portion of its length, a pad arm having a series of teeth movably mounted in said rectangular housing, a landing pad connected to the outer terminal of said pad arm, and power means in operative engagement with said pad arm teeth for extending and retracting said pad arm, the said rectangular housing being pivoted to said stabilizing member, said stabilizing member further including power means pivoted to said housing and to the aft end of said housing for adjusting the angular relationship of the pad arm and connected landing pad to compensate for varying terrain.

13. An airship including a fuselage, multiple power means having throttle controls mounted in spaced relation around the fuselage, a control member operated by the pilot, means connecting the control member to the throttle controls of the multiple power means, said control member being manipulated by the pilot for selectively controlling the power level of said multiple power means, said control member comprising a vertically disposed control stick, a ball and socket joint intermediate the length of said control stick to permit relative movement of the upper part of the stick with respect to the lower portion thereof, a centrally perforated member through which said control stick passes, said member having a plurality of spaced arms, throttle control arms depending from said spaced arms, means for equalizing pressure on said throttle control arms to normally maintain said control stick in a central position, and means connecting said throttle control arms to the throttle controls of said multiple power means.

14. An airship as set out in claim 13 with the addition of a support fixed to said control stick at a point below the ball and socket joint, said support being pivotally connected to said spaced arms, and means connected with said vertically disposed control stick for moving the latter vertically to effect synchronous vertical movement of said spaced arms and throttle control arms for effecting adjustment of the throttle controls of said multiple power means.

References Cited in the file of this patent

UNITED STATES PATENTS

| | | |
|---|---|---|
| D. 180,846 | Rocco | Aug. 20, 1957 |
| 984,269 | Friedel | Feb. 14, 1911 |
| 1,799,777 | Burnelli | Apr. 7, 1931 |
| 2,552,359 | Winslow | May 8, 1951 |
| 2,712,420 | Amster | July 5, 1955 |
| 2,726,510 | Goddard | Dec. 13, 1955 |
| 2,846,164 | Haberkorn | Aug. 5, 1958 |
| 2,859,003 | Servanty | Nov. 4, 1958 |

FOREIGN PATENTS

| | | |
|---|---|---|
| 610,143 | Great Britain | Oct. 12, 1948 |
| 59,633 | France | Feb. 3, 1954 |
| 761,230 | Great Britain | Nov. 14, 1956 |
| 1,168,730 | France | Sept. 1, 1958 |
| 160,981 | Australia | May 20, 1961 |